(12) United States Patent
Delas et al.

(10) Patent No.: US 6,545,680 B1
(45) Date of Patent: Apr. 8, 2003

(54) DUAL MECHANISM FOR COMPUTER-AIDED DESIGN

(75) Inventors: Frederic Delas, Saint-Cloud (FR); Gilles Lancien, Maisons Laffitte (FR)

(73) Assignee: Dessault Systemes S.A., Sursesnes Cedex (FR)

( * ) Notice: Subject to any disclaimer, the term of this patent is extended or adjusted under 35 U.S.C. 154(b) by 252 days.

(21) Appl. No.: 09/594,323

(22) Filed: Jun. 15, 2000

(51) Int. Cl.⁷ .............................................. G06T 17/00

(52) U.S. Cl. ....................................... 345/427; 345/419

(58) Field of Search ................................ 345/419, 425, 345/426, 427

(56) References Cited

U.S. PATENT DOCUMENTS 6,212,441 B1 * 4/2001 Hazama et al. ............. 345/425

* cited by examiner

*Primary Examiner*—Cliff N. Vo
(74) *Attorney, Agent, or Firm*—Joseph Levi, Esq.; Clifford Chance US LLP

(57) ABSTRACT

A method and system for computer-aided design and more particularly to the computer-aided design of sheet parts is presented. The method includes defining a feature in a definition view based on a specification defined by a user and generating the feature in the definition view. The alternative view is then updated. This updating includes analyzing the defined feature to determine if it can be made available to an alternative view, and representing the defined feature in the alternative view. The definition view and the alternative view include a folded view and an unfolded view.

24 Claims, 10 Drawing Sheets

DUAL MECHANISM FOR COMPUTER-AIDED DESIGN

BACKGROUND

The design of sheet metal parts usually requires the folding, stamping, or cutting of sheets of metal to provide desired shapes. Designers usually develop parts using a folded three-dimensional (3D) model. Once the 3D design has been completed, however, it is a two-dimensional (2D) counterpart that is transferred to the manufacturing line to manufacture the part. The 2D unfolded model of the part can be produced during or at the end of the design process. Because certain design operations can only be conducted on the unfolded version, the folded and unfolded versions are typically designed concurrently. For example, where a hole feature needs to be inserted at a precisely defined location on some element of the part, the 3D folded model does not always provide the degree of accuracy required and the user often needs access to an unfolded design version.

In currently available sheet metal part design systems, specific fold and unfold features are made available to users. When a user working on the folded version of the part inserts an unfold feature in the design, the system computes the required geometric transformations to go from the folded design to the corresponding unfolded design. The display controller of the system then displays the updated unfolded version to the user. When the user has completed the design task on the unfolded version, she may insert a fold feature in the design to cause the system to compute the reverse transformations so as to produce the folded version of the modified part. The display controller of the system then updates and displays the folded version to the user. In the design of complex parts, it is not unusual to find a large number of such fold and unfold features scattered throughout the design process tree.

The known technique of inserting fold-unfold features as needed has a number of drawbacks. The insertion of fold-unfold features does not play any actual role in the part design process and increases the complexity of the process. It also introduces severe constraints on the user when sequencing the various design operations. Reordering the features, for example, can be performed only between two consecutive fold and unfold features. In addition, if the user has defined a feature in one view, it is difficult for her to edit the feature and modify it using specifications in the other view.

There is therefore a need in the marketplace and a demand from users for a sheet metal part design system in which both the folded and the unfolded views of the part being designed are generally available at all times, or at least from time to time upon user's request, without the user having to add superfluous features, such as the above-mentioned fold and unfold features.

SUMMARY

Accordingly, the present invention provides a method and apparatus for computer-aided design and more particularly to the computer-aided design of sheet parts. The method includes defining a feature in a definition view based on a specification defined by a user and generating the feature in the definition view. The alternative view is then updated. This updating includes analyzing the defined feature to determine if it can be made available to an alternative view, and representing the defined feature in the alternative view. The definition view and the alternative view include a folded view and an unfolded view.

The analysis of the defined feature can include analyzing the defined feature in connection with previous features to determine if it can be made available in an alternative view. The updating step can also include the following steps. The feature can be stored in a list of features. A group of features connected through a relationship can be identified. The group can be searched for a connecting feature. The connecting feature can be stored in a feature list of transformations. The group can be searched for a connected feature linked to the connecting feature. Transformations for the connecting feature and the connected feature can be calculated. The connecting feature, connected feature, and their transformations can be stored in the feature list of transformations. The list of features can be searched for a supported feature. The feature list of transformations can be searched for a feature linked to the supported feature. The linked feature can cut the supported feature. The cut supported feature and its transformations can be stored in the feature list of transformations.

The transformations can be chosen from identity, cylindrical, and rigid transformations. A synchronous mode can be selected for automatically updating the alternative view. The alternative view can be updated at the request of a user. The definition view and the alternative view can be swapped at the request of a user. The folded view can include a three-dimensional view. The unfolded view can include a two-dimensional view. The definition view can be displayed in a computer window. The alternative view can be displayed in a different computer window. A list of features related to the definition view can be displayed in the window of the definition view. A list of features related to the alternative view can be displayed in the window of the alternative view. The design can include a sheet metal design. The alternative view can be concurrently updated according to changes made to the definition view.

In another embodiment, a computer system for computer aided design is presented. This system includes a computer. The computer includes a memory, a processor, a display device, and an input device. The system also includes executable software residing in the computer memory. The software is operative with the processor to define a feature in a definition view based on a specification defined by a user, generate the feature in the definition view, and update an alternative view. The update includes analyzing the defined feature to determine if it can be made available in the alternative view, and representing the defined feature in the alternative view. The definition view and the alternative view include a folded view and an unfolded view.

The input device can include a graphical input device for making changes to the definition view. The executable software can be further operative with the processor to display the definition view on the display device in a computer window and the alternative view in a separate computer window. The definition view and alternative view can be stored in a storage medium.

In another embodiment, a computer data signal embodied in a digital data stream for computer-aided design is presented. The computer data signal is generated by a method that includes transmitting over a computer communications network definitions of a feature in a definition view based on a specification defined by a user. Generated features in the definition view are also transmitted along with updates to an alternative view. The updates include the steps of analyzing the defined features to determine if it can be transformed to the alternative view, and transforming the defined features from the definition view to the alternative view. The definition view and the alternative view include a folded view and an unfolded view.

The computer data signal can include the step of receiving updates to the definition view. The generated data signal can adhere to the transmission control protocol/internet protocol.

The details of one or more embodiments of the invention are set forth in the accompanying drawings and the description below. Implementations can provide advantages such as a visualization system that allows concurrent design using simultaneous unfolded and folded representations of the sheet metal parts, creating an optimum and dedicated sheet metal part design environment. The propagation of a design modification from the folded representation to the unfolded representation and conversely can decrease the time and effort spent designing the sheet metal and increase the flexibility of the design. This is particularly true when features have to be reordered in the feature tree to take in account modifications of the original design.

The result is that a more efficient design environment for sheet metal parts can be achieved, which allows for a shortened design cycle that improves the quality of the part and understanding of the design by others by the suppression of unnecessary features.

DETAILED DESCRIPTION

This invention relates to the field of computer-aided design and more particularly to the computer-aided design of sheet parts. Although sheet metal is used throughout this disclosure, it should be understood that other sheet materials having similar folding and unfolding capabilities could also be designed using this apparatus and method.

Figure 1:
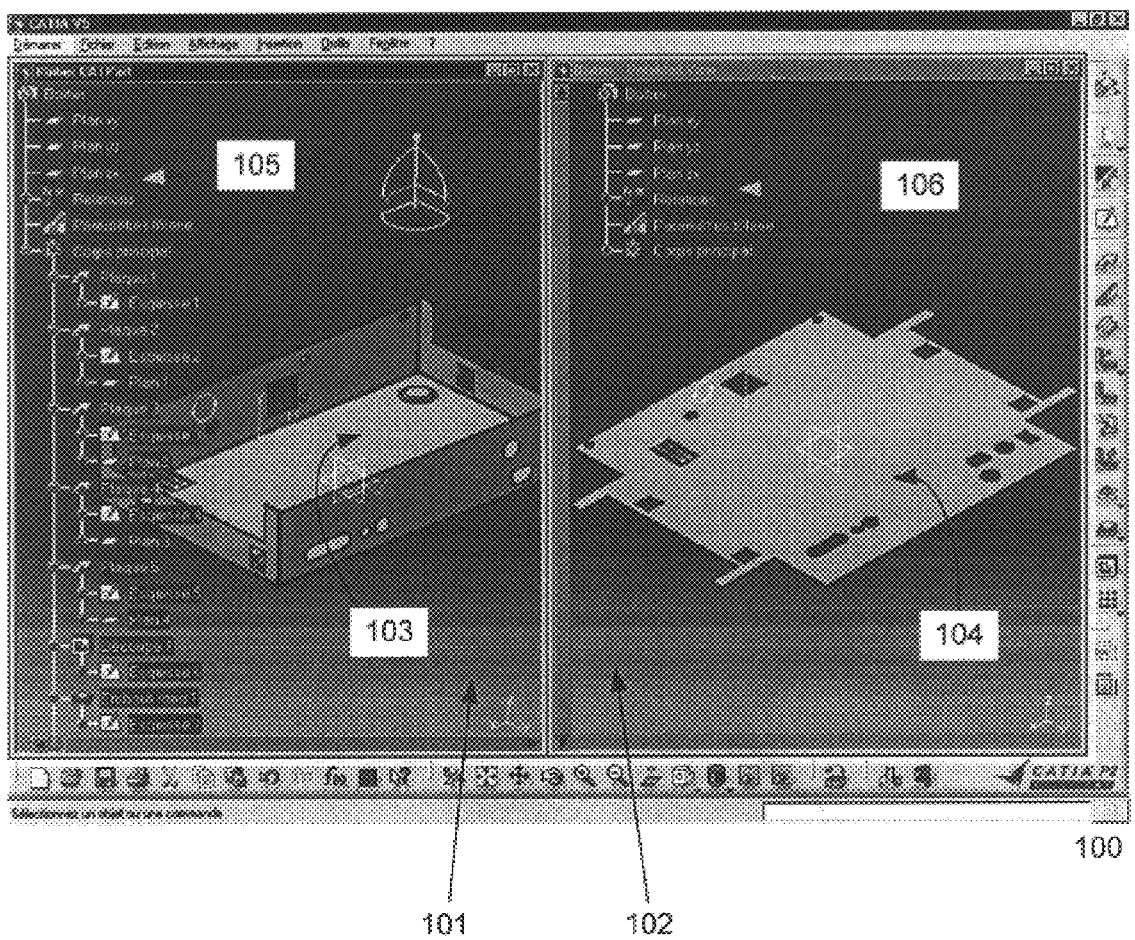
FIG. 1 is a sample screenshot of the computer-aided sheet metal design invention.

Referring first to FIG. 1, a sample screenshot of a computer program embodying this invention is shown. The computer program 100 has two main windows: the first is a folded view 101 of the sheet metal design, and the second is an unfolded view 102 of the sheet metal design. In each view, there is an image of the current sheet metal design. In the folded view 101, the image shows how the sheet metal looks when it is folded 103. In the unfolded view 102, the image shows how the sheet metal looks when it is unfolded 104. Available in each view is the feature tree 105 and 106 describing the features of the designed part. When a feature is added to either the folded view 103 or the unfolded view 104, it can be automatically updated on the alternative model. The list of features is concurrently updated as the views change.

The two views do not necessarily need to be displayed at the same time. A user can select to have two windows open with images of the folded and unfolded views or can select to have windows displaying only one representation of the design opened. This gives the user the versatility to decide what views are best for the design of a part or a feature for the part.

The user can make changes to only one view at a time. This view is called the definition view. The definition view of a feature is the view in which its specifications are entered by the user if these specifications are geometrically ones or the currently active view if these specifications are not geometrically ones. The other view is known as the alternative view. The definition view of a feature can be the folded view or the unfolded view. In FIG. 1, the folded view is shown as the definition view 101.

FIG. 2 consists of flowcharts of the system. Referring first to FIG. 2a, this procedure is executed when the user creates or modifies a feature in the definition view 201. After the user creates or modifies a feature in the definition view, the system stores the feature in the list of features 202. The list of features includes all the features in the design. The system then creates or modifies the feature in the definition view 203.

The system can be in dual mode or single mode. When the system is in dual mode, the alternative view can be automatically updated when the definition view is changed. If the system is not in dual mode 204, the procedure ends and the system waits for further user input. The system can be in two dual modes: synchronous and asynchronous dual mode. During synchronous dual mode, the system automatically updates the alternative view any time a change is made in the definition view. When the system is in asynchronous dual mode 204, the user must request an update of the alternative view. When the system is in asynchronous dual mode, the procedure ends and the system waits for further user input 204. When the system is in synchronous dual mode 204, the system updates the alternative view 205.

Figure 2A:
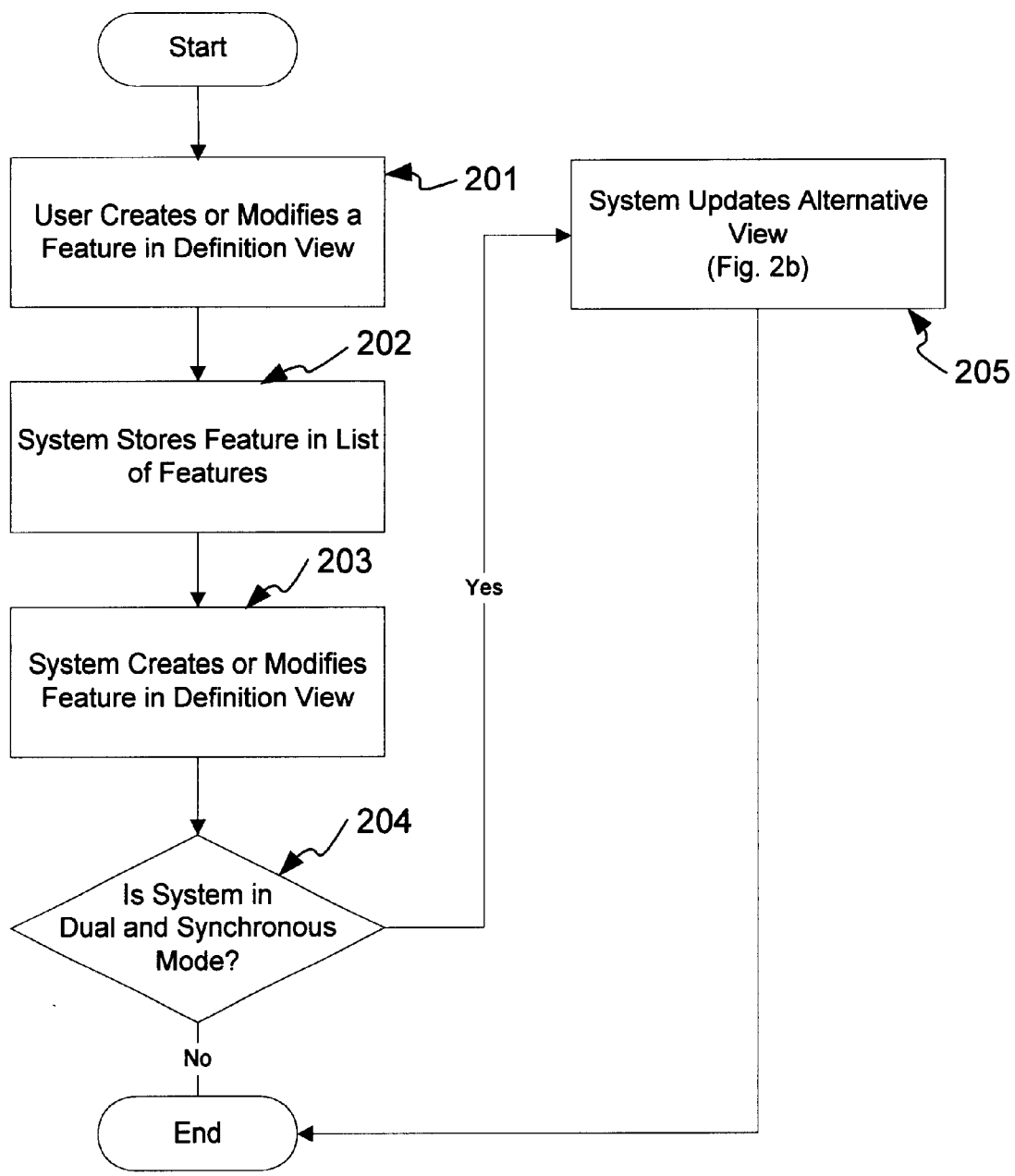
FIGS. 2a–d are flowcharts showing how the computer-aided sheet metal design invention works.
Figure 2B:
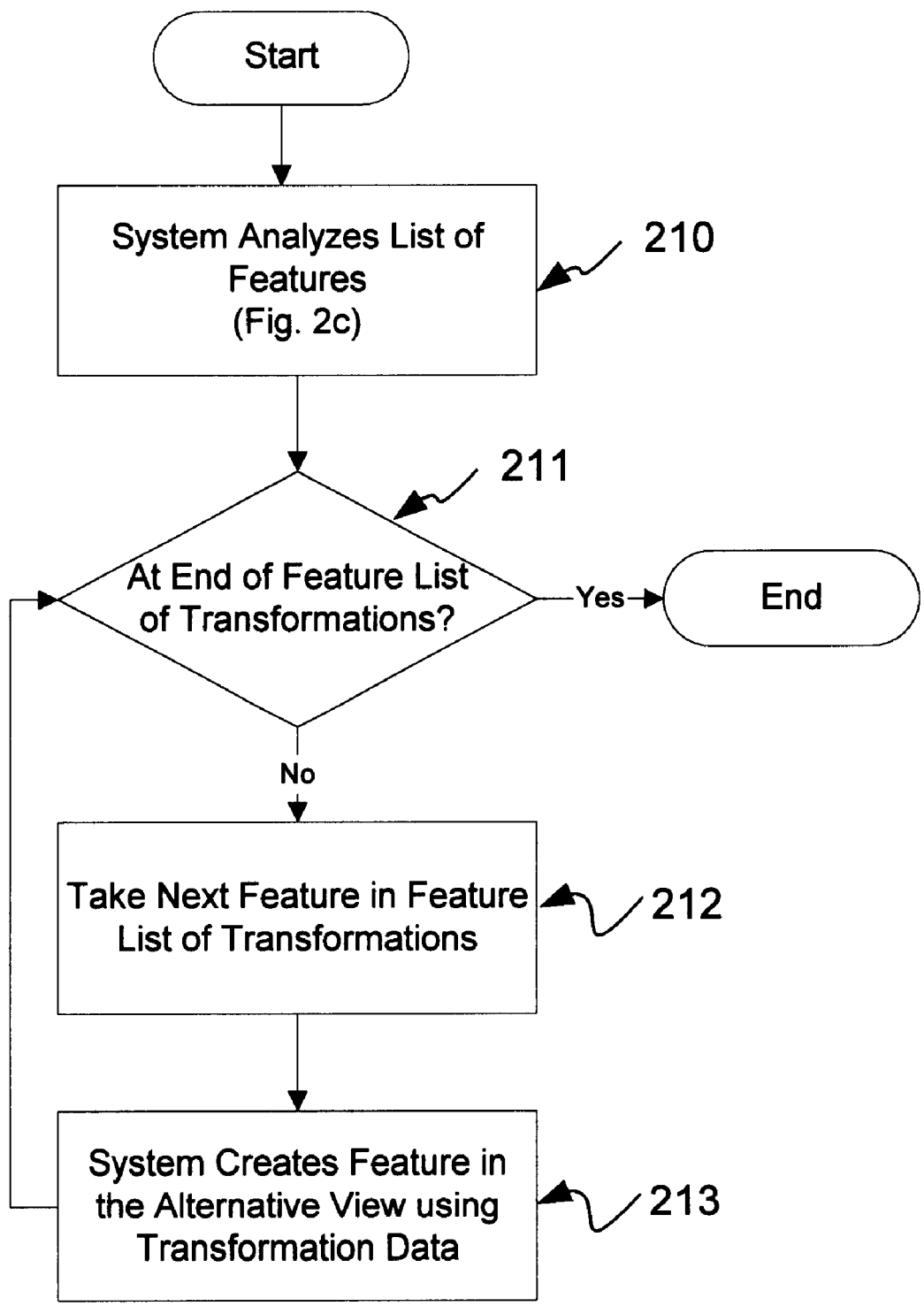

FIG. 2b describes how the system updates the alternative view 205. First, the system analyzes the list of features 210. This analysis updates the feature list of transformation. The feature list of transformations is a list of feature to be represented, if possible, in the alternative view or the definition view. All data needed for the transformations is stored with the identified features. Once the system updates the feature list of transformations, the system then checks if it is at the end of the list 211. When the system arrives at the end of the feature list of transformations, the alternative view is as updated as possible and the procedure ends 211. Otherwise, the system takes the next feature in the feature list of transformations 212. The system creates this feature in the alternative view using its associated transformation data 213. The system then loops back and continues analyzing each feature 212 and 213 in the feature list of transformation until it arrives at the end of the list 211.

Figure 3A:
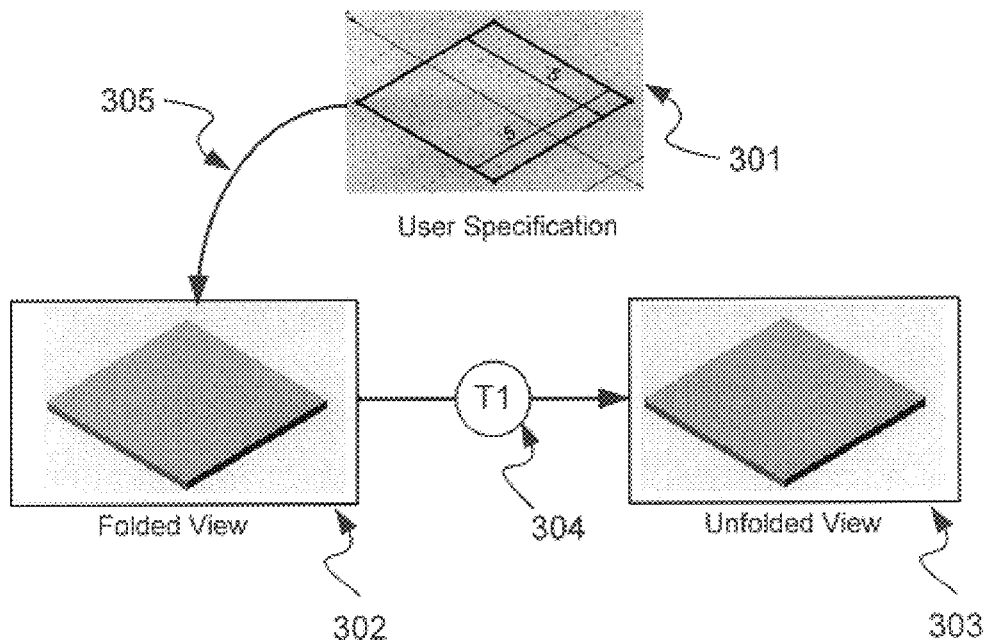
FIGS. 3a–e is an example of the use of the computer-aided sheet metal design invention.

There are three types of features that the system can add or modify. The first is a supporting feature, which is a stand-alone feature that defines a base for the design. An example of a supporting feature is a wall on a bracket (FIG. 3a gives an example of such a wall 301). The second is a connecting feature, which is a feature that connects supporting features. An example of a connecting feature is a bend that connects two walls together (FIG. 3c gives an example of such a bend 326). The third is a supported feature, which is a feature that is added to a supporting or connecting feature. An example of a supported feature is a hole or a stamp in a wall or bend (FIG. 3d gives an example of such a hole).

Figure 2C:
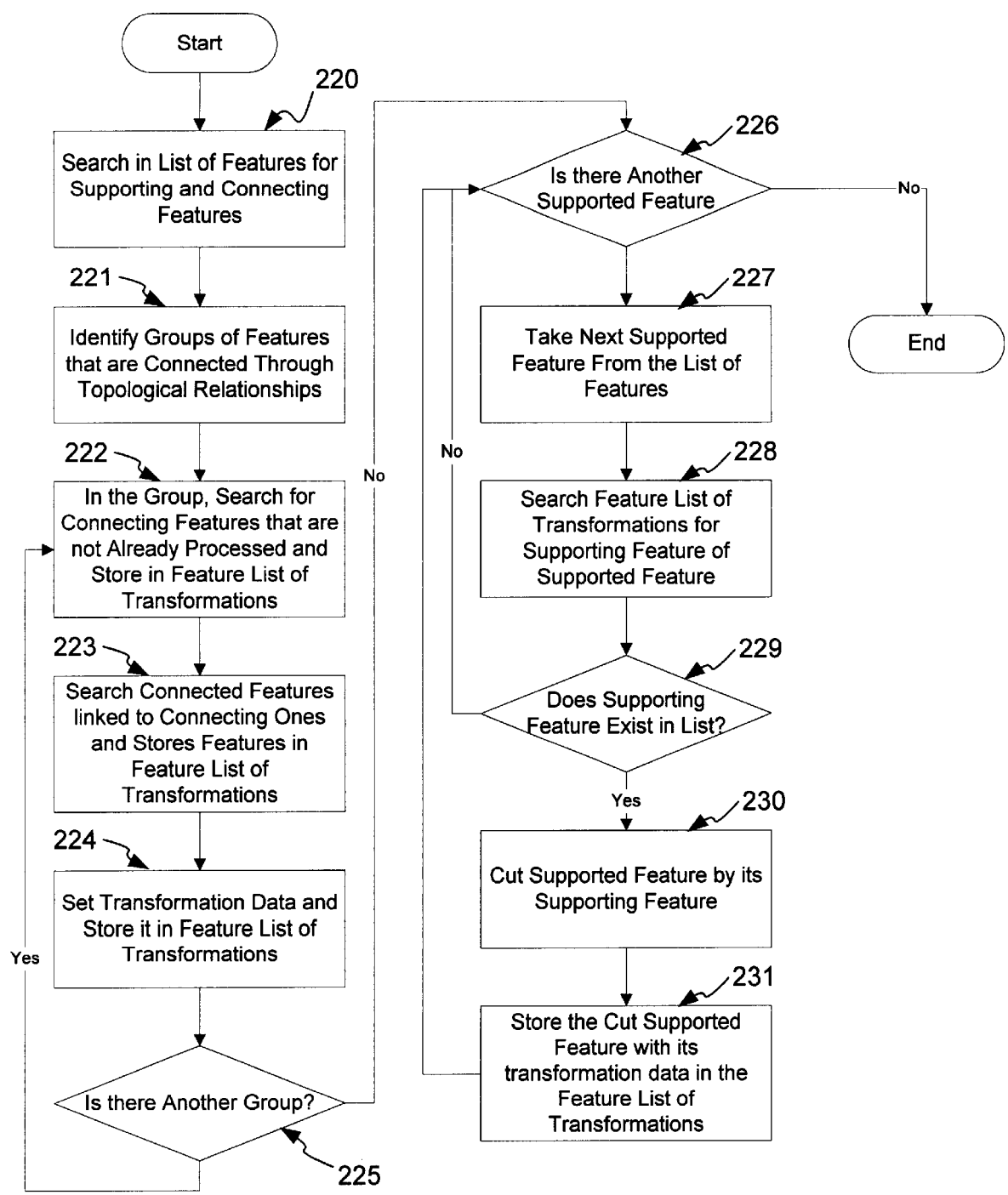

FIG. 2c describes how the system analyzes the list of features 210. The system first searches the list of features for supporting and connecting features 220. It identifies groups of features that are connected through relationships coming from the specifications 221. An example of such a relationship is two supporting features, such as two walls, connected by a connecting feature, such as a bend that connects the two walls. In each group, the system searches connecting features that are not already processed and stores the connecting features in the feature list of transformations 222. The system then searches for connected features linked to the stored connecting features and stores these features in the feature list of transformations 223. Transformation data is then set and stored in the feature list of transformations 224. The system checks if there is another group to be analyzed 225, and if so loops back to the search for connecting features in that group 222.

When there are no more groups to be analyzed 225, the system checks whether there are any supported features to be analyzed 226. When there are supported features to be analyzed, the system takes the next supported feature from the list of features 227. The system then searches the feature list of transformations for a supporting feature linked to the supported one 228. If this supporting feature does not exist in the list 229, then the system goes on to the next supported feature 226. When the supporting feature for the supported feature exists in the feature list of transformations, the system cuts the supported feature by its supporting feature 230. The cut supported feature and its transformation data is stored in the feature list of transformations 231. This process continues until all the supported features have been analyzed 226.

Figure 2D:
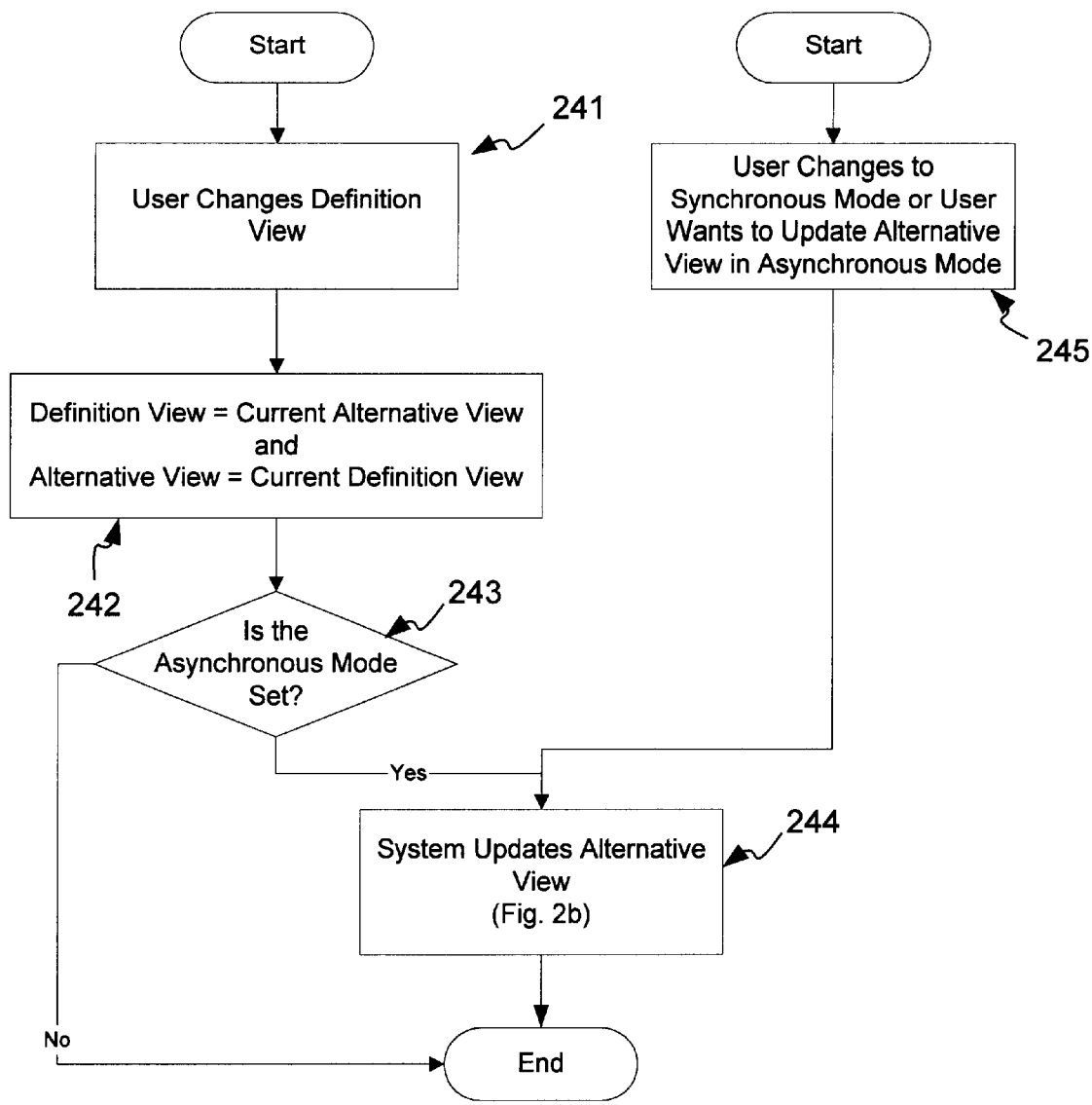

The user can change the definition view to either the folded view or unfolded view to facilitate her design. Referring now to FIG. 2d, when the user changes the definition view 241, the system swaps the definition view and the alternative view 242. When the system is in asynchronous mode 243, it must update the alternative view 244 to ensure that the old alternative view has been fully transformed so it can be used as the new definition view. When the system is in synchronous mode 243, the alternative view has already been updated.

The user can also change the dual mode and synchronous mode. When the user changes modes to a dual synchronous mode 245, the system again updates the alternative view 244. This is done to synchronize the alternative view with the definition view as the user requested. Similarly, when the user requests an update during asynchronous mode 245, the system updates the alternative view 243 as the user requested.

The system can use various transformations to obtain an associated transformation for supporting, connecting, or supported features. The system can use identity transformations, which transfers but does not change the feature from one model to another. The system can use cylindrical transformations, which cylindrically bend a feature to a desired angle. The system can also use rigid transformations, which rotate the feature to a desired angle. Any of these transformations can be inverted to allow the system to calculate the transformations of related features. These transformations can also be combined to create more advanced transformations. This description of transformations is not intended as an exhaustive list. Other transformations known in the art can be similarly used to transform between the folded and unfolded view.

FIG. 3 describes an embodiment of this invention on an example of a sheet metal bracket. Each step is represented by a figure. Each figure contains a user specification, a folded view, and an unfolded view. The user specification defines what the user is attempting to build. The user specification can be implemented on the folded view or the unfolded view, depending on the user's design intent. The specifications are entered in the definition view of the feature, which can be the folded view or the unfolded view. When a new feature is added, the system can update the alternative view. These transformations are represented by Tx, where T1 is an identity transformation, T2 is a cylindrical transformation, and T3 is a rigid transformation.

FIG. 3a is the first step in this example. The user specification 301 being a planar contour and a thickness defines the first feature, Wall 1, which is a wall area of the bracket defined by the user. The definition view of this feature is the folded view 305. Since this is the first feature, the representation of the part in the folded view 302 is the shape itself as determined by the user. It has the same representation in the unfolded view 303 since no folding has yet occurred. The transformation applied to go from the folded view 302 to the unfolded view 303 is the identity transformation (T1) 304.

Figure 3B:
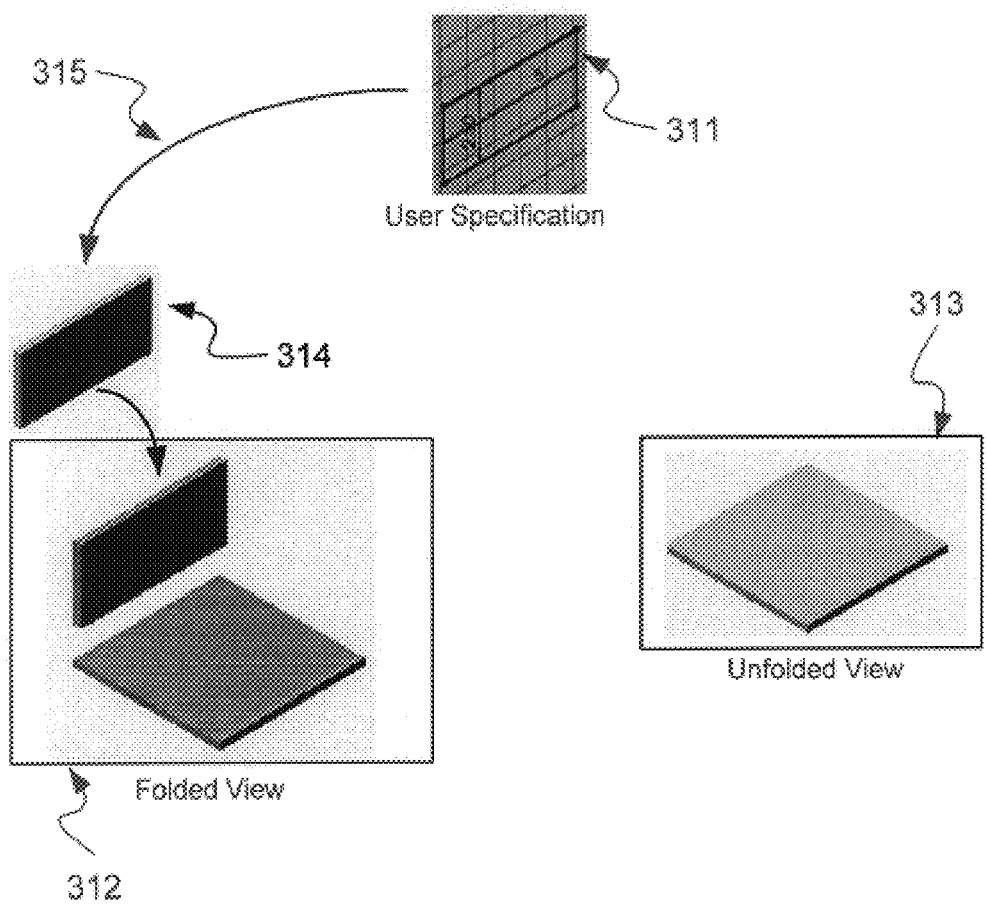
Figure 3C:
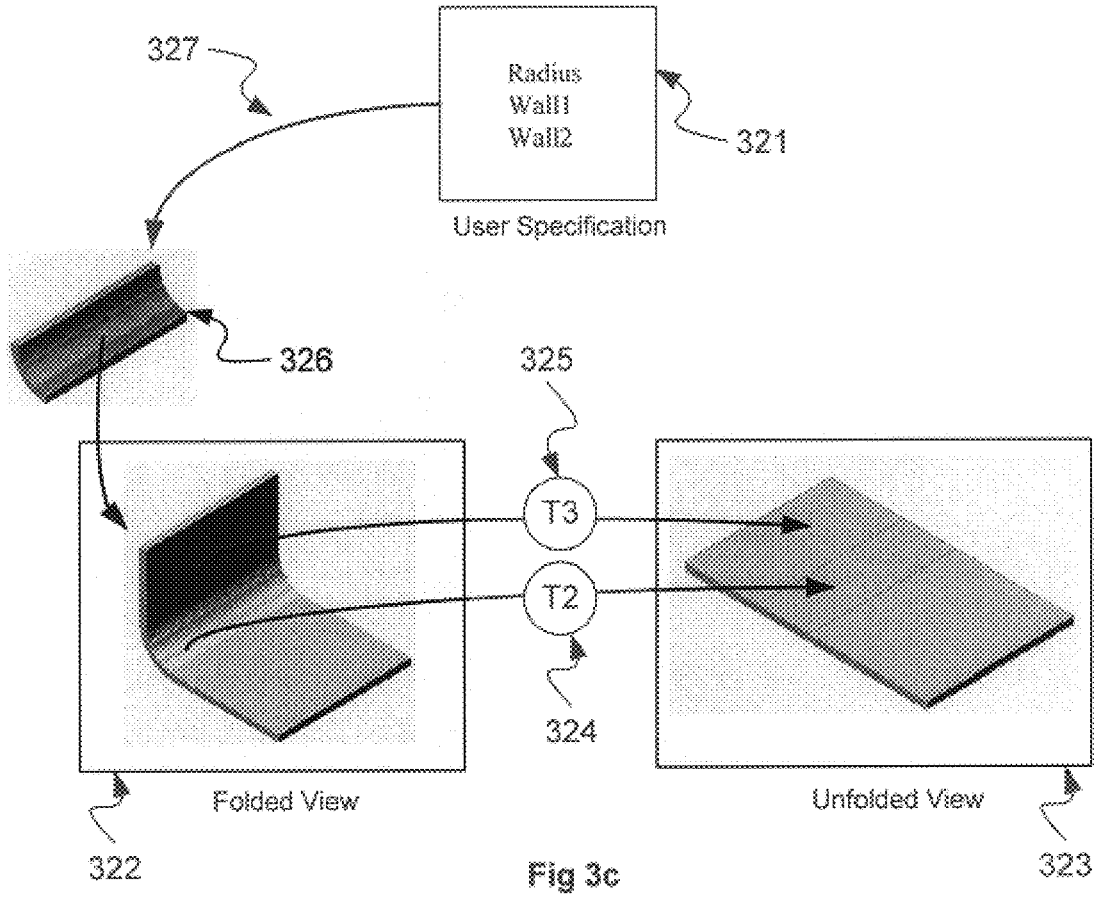
Figure 3D:
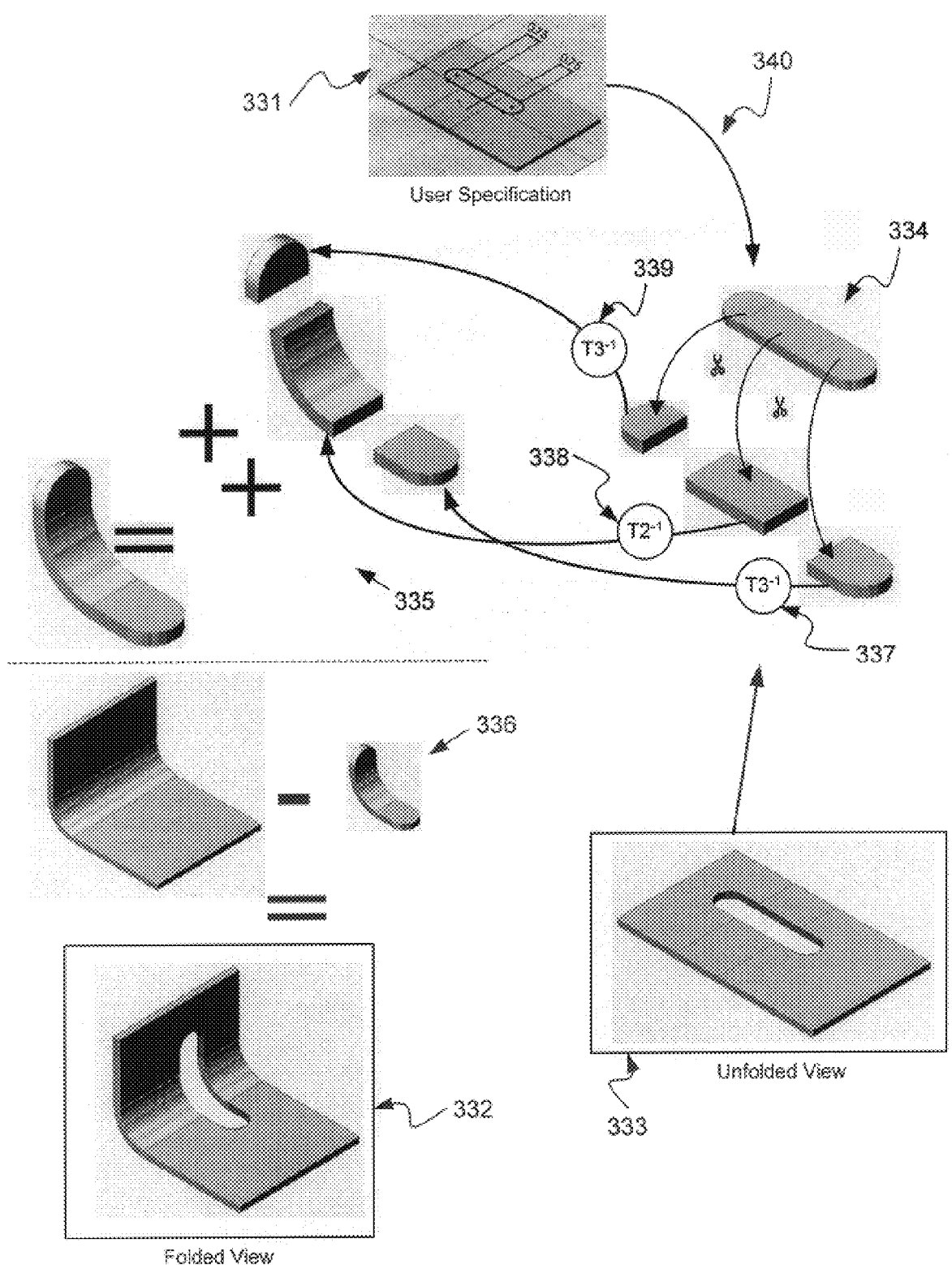

FIG. 3b shows the creation of Wall 2, a second wall feature 314. This feature is intended as the second wall of the bracket and its planar contour is shown in the user specification 311 with the thickness of the wall. The definition view for this second feature is again the folded view 315. The representation in the folded view 312 lacks an actual geometrical relationship with the previous feature. At this stage, only a general representation of the new wall 314 can be made because the exact location will depend on a connecting feature, which has not yet been created. The system determines that the folded view cannot be unfolded because the system has no indication of the precise location of the second wall with respect to the first wall. The unfolded view 313 remains the same, and the system keeps the related information until a connecting feature is defined.

FIG. 3c shows the creation of Bend, a bend feature 326. The definition view is again the folded view 327 and the shape is the result of the user specification in terms of the appropriate radius, Wall 1, and Wall 2 321. Wall 1 and Wall 2 have been modified in the folded view 322 to take into account the effect of the bend. The system then analyzes the effect of the new feature together with the previous ones and determines that the set of features can now be unfolded. It computes the required transformations, namely a cylindrical transformation (T2) 324 for the bend and a rigid transformation (T3) 325 for the new shape of Wall 2, and applies the transformations to the Wall 2 and Bend features to determined the corresponding unfolded view 323.

FIG. 3d shows the creation of a hole feature. Because the user can only determine the precise location and dimensions of the hole on the unfolded view 333, it is that view that the user selects as the definition view 340. The user specifies the hole 331 with its contour and depth, and the system applies the hole in the unfolded view 333 and analyzes the result. The system determines that the resulting unfolded part can be folded since the material removed from the part can be split into three components, each belonging to an existing portion of the folded part 334. The system then retrieves the transformations T1, T2, and T3 used to unfold the previous features and computes the reverse transformations $T1^{-1}$ 337, $T2^{-1}$ 338, and $T3^{-1}$ 339. Each component of the hole is then transformed by the corresponding reverse transformation and the three folded portions are merged to produce the folded hole shape 335. The folded hole shape is then subtracted from the previous folded part to produce the new folded part 336. The folded part can then be displayed in the folded view 332. The portions of the drawing showing the various merging, subtractions, and transformations are given for explanation purposes only and would probably not appear on the display screen. Only the resulting part shown in the folded view 332 would probably be displayed to the user.

Figure 3E:
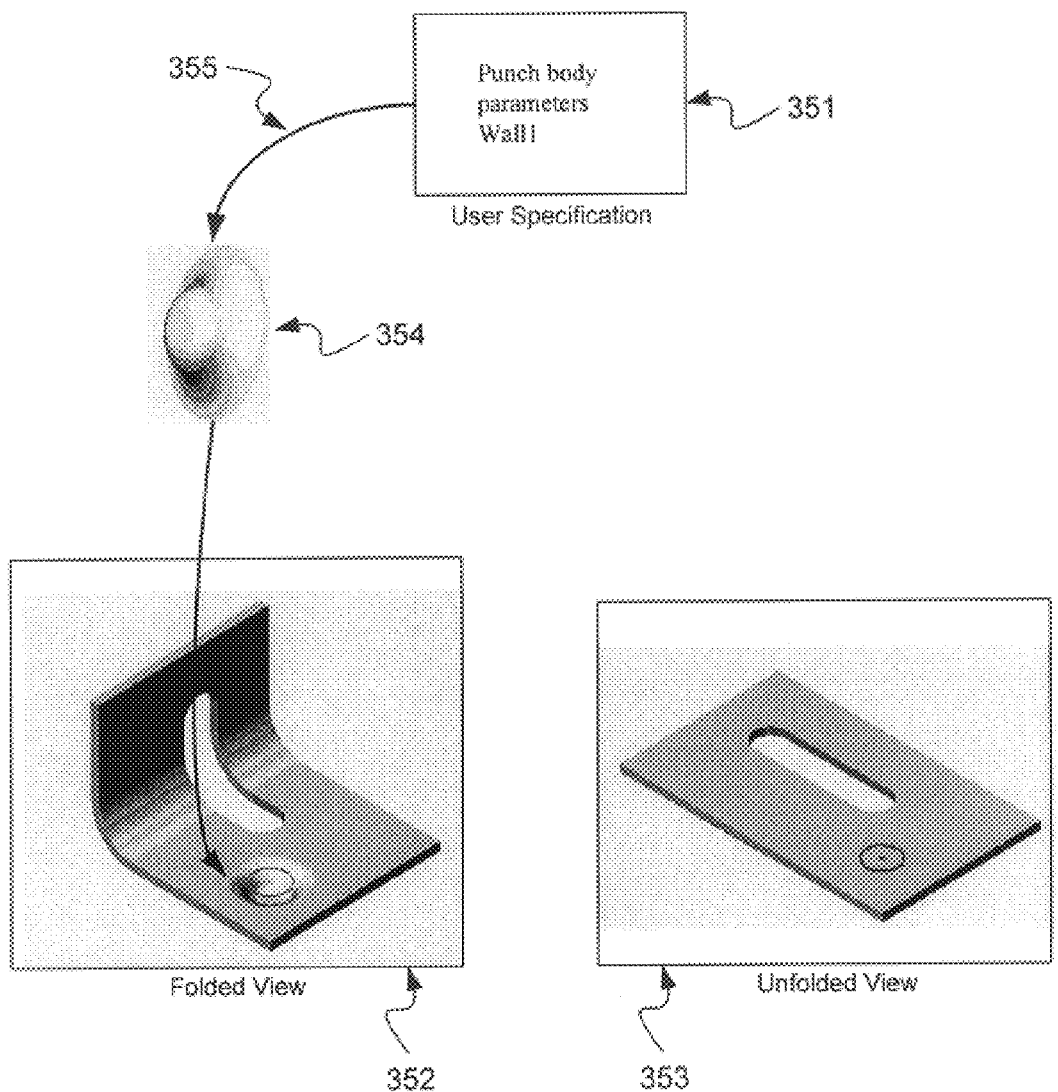

FIG. 3e shows the insertion of a stamping feature 354. As such features are generally intended for use in assembly operations where the current part will be linked to another part, the definition view is the folded view 355. The user specifies the stamping feature by the parameters of the punch body to be used in the stamping operation and Wall 1, which is the wall the stamp will appear on. The system determines the shape of the stamp and the result in the folded view on the basis of the specifications entered by the user 351. The system determines that the part can be unfolded since the new feature is applied to an existing supporting element of the part, Wall 1. To develop the result in the unfolded view 353, the system computes the intersection of the punch body with the metal sheet, which is then shown as a footprint, also called a scar, in the unfolded view 353.

Figure 4:
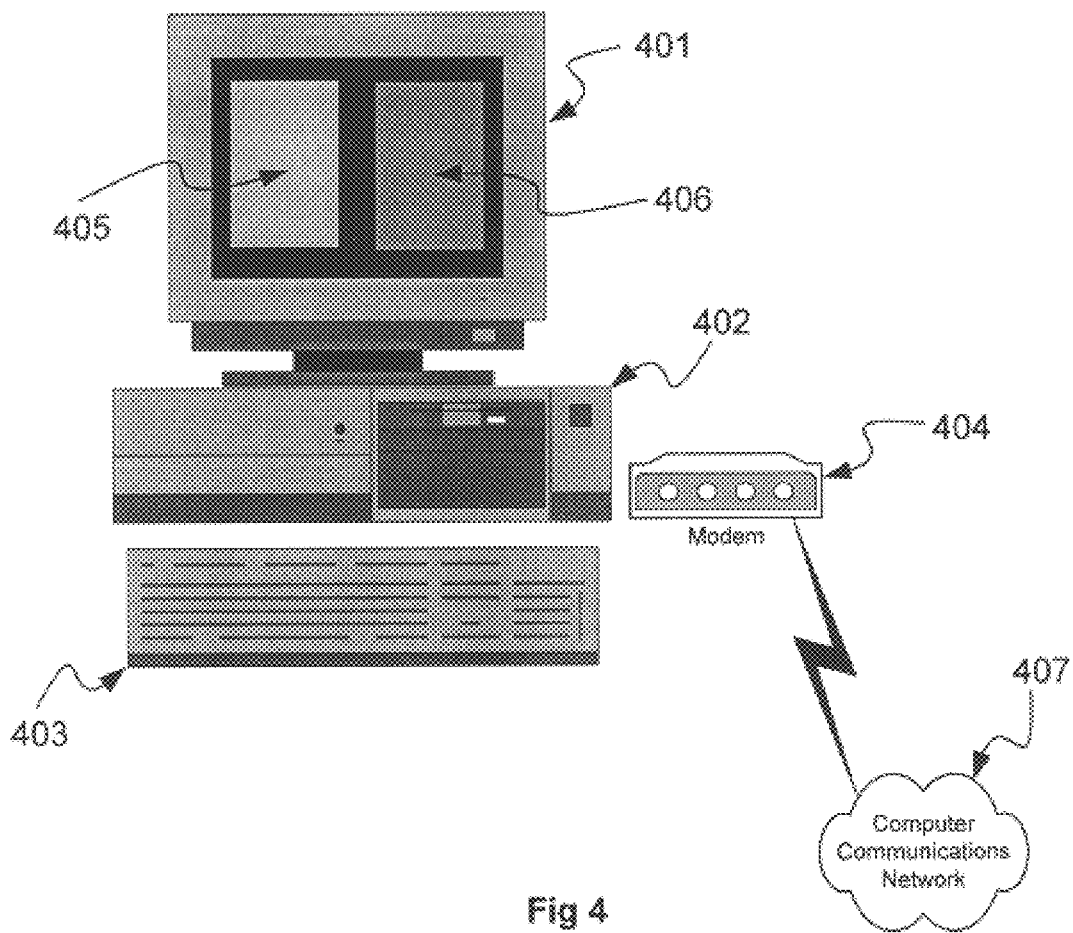
FIG. 4 is a computer diagram of the computer-aided sheet metal design invention.

Referring now to FIG. 4, a computer system for computer-aided sheet metal design is shown. The computer includes a memory device and a processor 402, a display device 401, and an input device 403. Executable software residing in the computer memory is operative with the processor to perform the computer-aided sheet metal design described above. The display device 401 can display the two different views, the folded view 405 and the unfolded view 406. The two views can coexist on the screen in separate windows or can be toggled with only one view shown at one time. The definition and alternative models can be stored in a storage medium, such as the memory or a hard disk drive.

The computer-aided sheet metal design system can also operate by receiving data streams over a network connection device, such as a modem 404, from a computer communications network 407. The data streams can include information about the folded and unfolded views and transformation updates on either view. The computer data signal can adhere to a transmission control protocol, such as the internet protocol. This can allow remote or shared designing of the sheet metal.

A number of embodiments of the present invention have been described. Nevertheless, it will be understood that various modifications may be made without departing from the spirit and scope of the invention. Accordingly, other embodiments are within the scope of the following claims.

What is claimed is:

1. A computer-aided design method, the method comprising:
    defining a feature in a definition view based on a specification defined by a user;
    generating the feature in the definition view; and
    updating an alternative view, wherein the updating comprises:
        analyzing the defined feature to determine if it can be made available in an alternative view; and
        representing the defined feature in the alternative view;
    wherein the definition view and the alternative view comprise a folded view and an unfolded view.

2. The method of claim 1, wherein the step of analyzing the defined feature additionally comprises analyzing the defined feature in connection with previous features to determine if it can be made available in an alternative view.

3. The method of claim 1, wherein the updating step additionally comprises:
    storing the feature in a list of features;
    identifying a group of features connected through relationships;
    searching the group for a connecting feature;
    storing the connecting feature in a feature list of transformations;
    searching the group for a connected feature linked to the connecting feature;
    calculating transformations for the connecting feature;
    calculating transformations for the connected feature; and
    storing the connecting feature, the connected feature, and their transformations in the feature list of transformations.

4. The method of claim 3, additionally comprising:
    searching the list of features for a supported feature;
    searching the feature list of transformations for a feature linked to the supported feature;
    cutting the supported feature by the linked feature; and
    storing the cut supported feature and its transformations in the feature list of transformations.

5. The method of claim 3, wherein the transformations are chosen from a list comprising an identity transformation, a cylindrical transformation, and a rigid transformation.

6. The method of claim 1, additionally comprising selecting a synchronous mode for automatically updating the alternative view.

7. The method of claim 1, wherein the step of updating an alternative view additionally comprises updating an alternative view at the request of a user.

8. The method of claim 1, additionally comprising swapping the definition view and the alternative view at a request of a user.

9. The method of claim 1, wherein the folded view additionally comprises a three-dimensional view.

10. The method of claim 1, wherein the unfolded view additionally comprises a two-dimensional view.

11. The method of claim 1, additionally comprising displaying the definition view in a computer window.

12. The method of claim 1, additionally comprising displaying the alternative view in a computer window.

13. The method of claim 11, additionally comprising displaying a list of features related to the definition view in the computer window.

14. The method of claim 12, additionally comprising displaying a list of features related to the alternative view in the computer window.

15. The method of claim 1, wherein the design comprises a sheet metal design.

16. The method of claim 1, wherein the step of updating the alternative view comprises concurrently updating the alternative view according to changes made to the definition view.

17. A computer system for computer-aided design, the system comprising:
    a computer, wherein the computer comprises a memory, a processor, a display device, and an input device; and
    executable software residing in the computer memory wherein the software is operative with the processor to:
        define a feature in a definition view based on a specification defined by a user;
        generate the feature in the definition view; and
        update an alternative view, wherein the updating comprises:
            analyzing the defined feature to determine if it can be made available in the alternative view; and
            representing the defined feature in the alternative view;
    wherein the definition view and the alternative view comprise a folded view and an unfolded view.

18. The computer system of claim 17, wherein the input device comprises a graphical input device for making changes to the definition view.

19. The computer system of claim 17, wherein the executable software in the computer memory is further operative with the processor to display the definition view on the display device in a computer window.

20. The computer system of claim 17, wherein the executable software in the computer memory is further operative with the processor to display the alternative view on the display device in a computer window.

21. The computer system of claim 17, wherein the definition view and alternative view are stored in a storage medium.

22. A computer data signal embodied in a digital data stream for computer-aided design, wherein the computer data signal is generated by a method comprising the steps of:

transmitting over a computer communications network definitions of a feature in a definition view based on a specification defined by a user;

transmitting over a computer communications network generated features in the definition view; and transmitting over a computer communications network updates to an alternative view, wherein the update comprises:

analyzing the defined feature to determine if it can be transformed to the alternative view; and transforming the defined feature from the definition view to the alternative view;

wherein the definition view and the alternative view comprise a folded view and an unfolded view.

23. The computer data signal in claim 22, additionally comprising receiving updates to the definition view.

24. The computer data signal in claim 22 wherein the signal generated adheres to the transmission control protocol/internet protocol.

* * * * *

UNITED STATES PATENT AND TRADEMARK OFFICE
CERTIFICATE OF CORRECTION

PATENT NO. : 6,545,680 B1
DATED : April 8, 2003
INVENTOR(S) : Delas et al.

It is certified that error appears in the above-identified patent and that said Letters Patent is hereby corrected as shown below:

<u>Title page,</u>
Item [73], Assignee, "Dessault Systemes, S.A., Suresnes Cedex (FR)" should read as
-- Dassault Systemes, S.A., Suresnes Cedex (FR) --

Signed and Sealed this

Thirteenth Day of May, 2003

JAMES E. ROGAN
*Director of the United States Patent and Trademark Office*